F. REDDAWAY.
PNEUMATIC TIRE.
APPLICATION FILED FEB. 18, 1908.

922,631.

Patented May 25, 1909.

Witnesses.

Inventor.
Frank Reddaway
By his Atty.

UNITED STATES PATENT OFFICE.

FRANK REDDAWAY, OF PENDLETON, MANCHESTER, ENGLAND.

PNEUMATIC TIRE.

No. 922,631.  Specification of Letters Patent.  Patented May 25, 1909.

Application filed February 18, 1908. Serial No. 416,599.

*To all whom it may concern:*

Be it known that I, FRANK REDDAWAY, a subject of Great Britain, residing at Cheltenham street, Pendleton, Manchester, in the county of Lancaster, England, manufacturer, have invented new and useful Improvements in Pneumatic Tires, of which the following is a specification.

My invention relates to the covers of pneumatic tires, particularly applicable for motor-cars and similar heavy road vehicles, which tire cover embodies means for preventing skidding of such vehicles on slippery roads or when turning abrupt corners, and also for preventing damage to the tires when they are under excessive compression.

Figure 1:
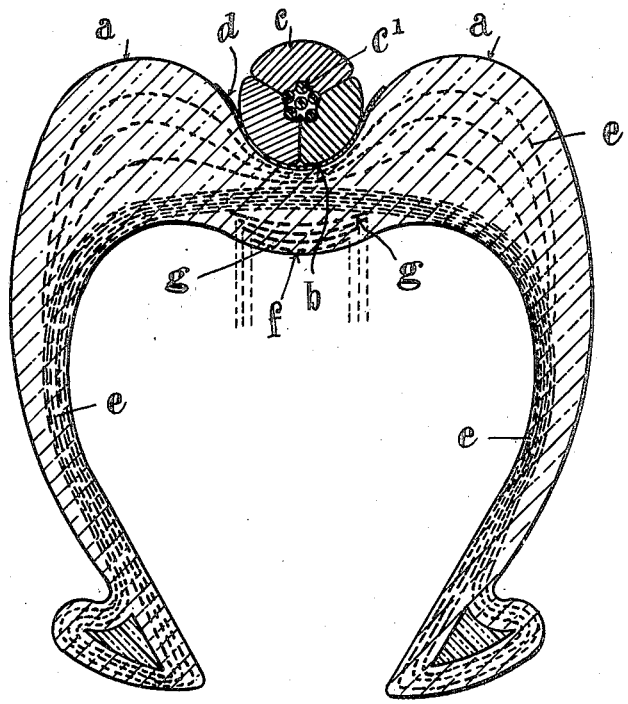
Figure 2:
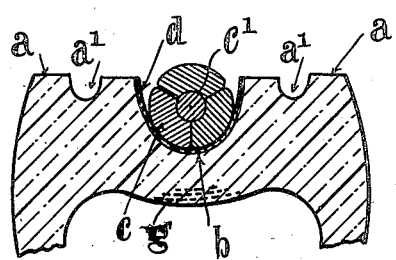
Figure 3:
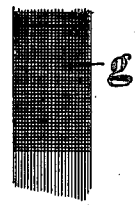
Figure 4:
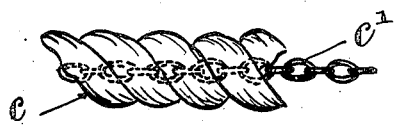

In the accompanying drawing, Figure 1 indicates a section of a tire cover made in accordance with my invention. Fig. 2 is a portion of a section of tire cover showing a modification. Figs. 3 and 4 show detail parts of the invention.

The tire cover is used in conjunction with an air tube in the usual way and it may be made in any convenient manner for securing to any one of the various kinds of rim, as the method of attaching the cover to the rim forms no part of my invention.

When making a tire cover in accordance with my invention instead of molding the rubber tread with a complete arch or convexity as is the usual practice, I form the tread with a double convexity $a\ a$ obtained by providing a central circumferential cavity $b$. The double arch or convexity $a\ a$ is thus disposed at each side of the tire cover as is apparent from the drawings. The tire has two points of contact with the ground provided by the two separate or twin side treads $a\ a$. These two separate treads constitute very efficient means for the prevention of side-slip or skidding. An important means for preventing such skidding or side slip is obtained by the aid of a rope $c$ of fiber or fibrous material disposed within and practically filling up the central cavity of the tire cover. This rope $c$ provides an additional contact surface or tread and to prevent the rope from stretching it is provided with a core of metal. As shown in Fig. 2 this metallic core $c'$ may take the form of an endless ring of solid wire of suitable gage, although, as indicated in Fig. 1, the metallic core $c'$ preferably consists of several strands of wire, which would provide a more flexible core than the solid wire and would not be so liable to snap under sudden stress. Instead of wire I may use a flexible metallic chain $c'$, as shown in Fig. 4. In any case the core $c'$ is first made in the form of an endless ring of the required diameter and around such endless ring, a suitable fiber is wrapped, plaited or otherwise served to obtain an endless rope of the requisite diameter and strength which is sprung into position in the cavity $b$. To prevent chafing of the rubber bed of the rope $c$ owing to possible creeping of the rope, the cavity $b$ is provided with a facing of canvas $d$ or other wear resisting material. The separate treads $a$ may be either rounded, as in Fig. 1, or flattened as in Fig. 2, and in the latter case, or in both instances if desired, circumferential grooves $a'$ may be formed in the tread.

The tire cover is molded and made up from rubber, strengthened in the usual manner by insertions of "bias" canvas $e$, and in such a manner as to produce the two convexities with an intermediate concavity. Owing to the internal pressure exerted by the air-tube on the inner crown of the tire cover when the air tube is fully inflated, it is essential that I should provide some means for resisting such pressure in addition to the endless rope $c$ otherwise there would be a tendency to force the cover outward at the crown marked $f$ thus destroying the value of the invention by failing to preserve the central cavity $b$. To prevent this, in addition to the usual insertions of "bias" canvas $e$ introduced as the tire is built-up, I provide the inner crown of the tire cover at the part marked $f$ with one or more circumferential pressure resisting bands $g$, which, when applied, form an intermediate zone which effectually preserves the intermediate cavity $b$. Preferably I use several such circumferential pressure resisting bands $g$ (three being a suitable number). The band or bands $g$ may be of any suitable material or substance such as strips or lengths of canvas or fabric with the threads "straight" or at right-angles, as indicated by the diagram Fig. 3, such a class of canvas serving to produce a most effective zone which insures the cavity $b$ being preserved under all circumstances. The pressure resisting bands $g$ forming the practically non-expansible intermediate zone may be applied in separate lengths of gradually increasing width as shown in Fig. 1; or a length of the canvas or material may be wound circumferentially for a sufficient number of convolutions. Such bands, although they may possibly yield slightly to the internal pressure exerted on them, are unyielding enough to preserve the cavity $b$ and so maintain the double convexity or twin side treads $a$ $a$. The non-expansible intermediate zone produced by the inserted canvas layers $g$ serves, when a slight or sufficient separation has taken place, to anchor the convexities or twin tire peripheries $a$, $a$, and to resist further spreading or separation and thus side-slip is prevented or more quickly checked.

The rope $c$ with metallic core, and the pressure resisting circumferential bands $g$ may be used together in the tire cover or separately as desired, in conjunction with the tire cover.

I declare that what I claim is.

In combination in a tire cover, the twin side treads forming the central circumferential cavity, an endless rope of fibrous material, located in said cavity, a metallic core in said rope, and internal pressure resisting bands inserted in the material forming the cover below said cavity.

In testimony whereof I have signed my name to this specification in the presence of two subscribing witnesses.

FRANK REDDAWAY.

Witnesses:
JOSHUA ENTWISLE,
ALFRED YATES.